Patented Sept. 11, 1951

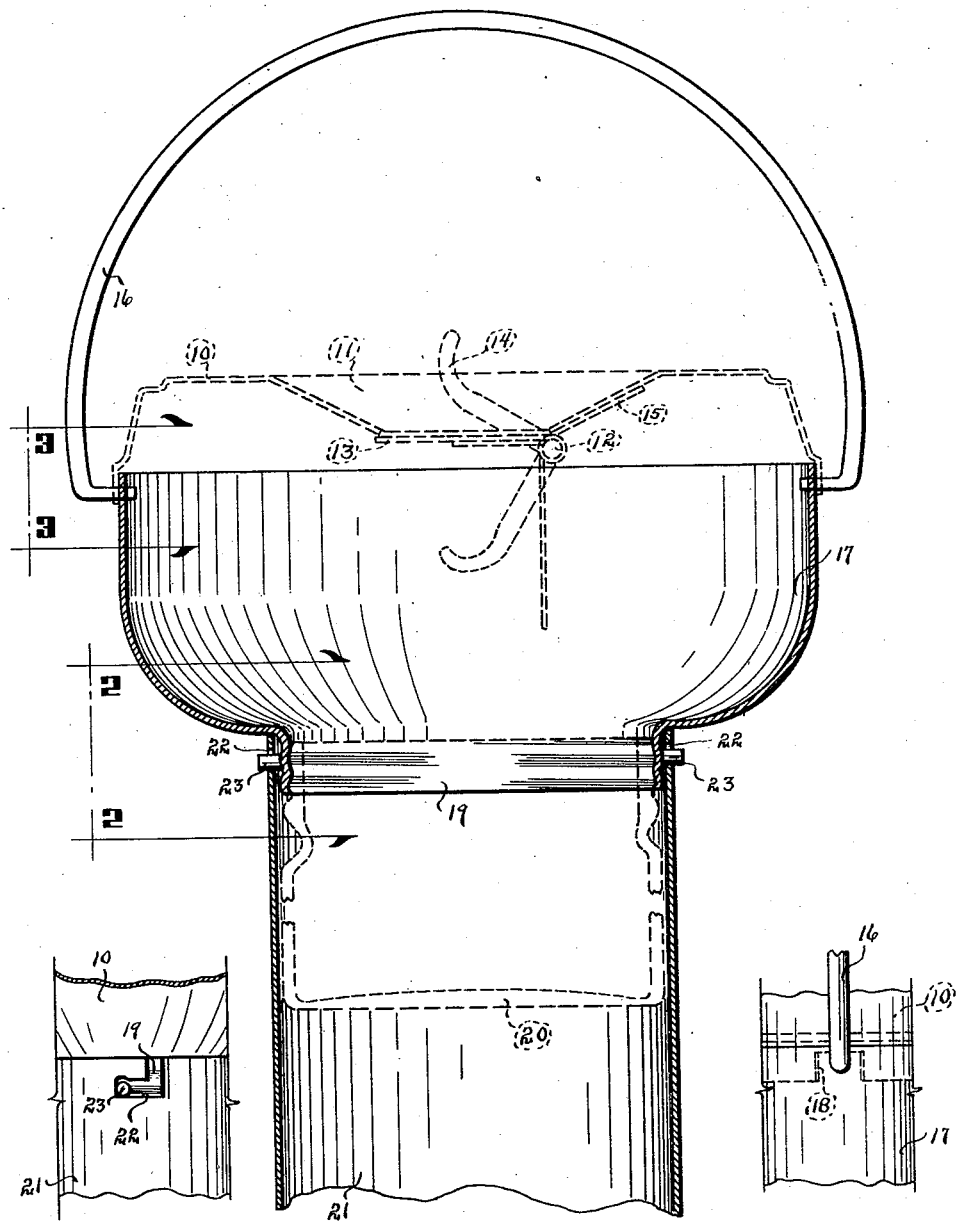

2,567,166

UNITED STATES PATENT OFFICE 2,567,166

RECEPTACLE CONSTRUCTION

Marion Talbert Dick, Des Moines, Iowa, assignor to Cadet Smokestands Company, Des Moines, Iowa, a business trust Application January 5, 1948, Serial No. 618

4 Claims. (Cl. 232—43.2)

This invention relates to a means for attaching a receiving bowl to a container and to a supporting tubular column. While this invention may be used successfully in connection with smokestands such as disclosed in United States Letters Patent 2,248,163, it may be used for other purposes wherein it is desired to connect a bowl element to a container and also to a supporting column. The invention therefore is not a smokestand per se.

The principal object therefore of my invention is to provide a means for detachably securing a receiving bowl to a jar or like container, and the resultant assembly to a detachable supporting tubular column.

A further object is to provide a detachable container for urns or bowls having trap door hopper tops, that permits the normal operation of the trap door without interference.

A still further object of this invention is to provide a detachable container for bowls having trap door hopper tops that permits the opening of the container to be of relatively small diameter.

A still further object of my invention is to provide a detachable container for the bowl urns of smokestands now being manufactured, thereby increasing the capacity of such smokestands and making possible the use of glass (if desired) as the material of the container.

A still further object of my invention is to provide a receptacle construction or assembly and its attachment to a supporting column, that is economical in manufacture, durable in use, and refined in appearance.

These and other objects will be apparent to those skilled in the art.

My invention consists in the construction, arrangement and combination of the various parts of the device, whereby the objects contemplated are attained as hereinafter more fully set forth, pointed out in my claims, and illustrated in the accompanying drawings, in which:

Fig. 1 is a side-sectional view of my receptacle construction and support.

Fig. 2 is a side view of a portion of the device showing one of the bayonet-slot attaching means, and is taken on line 2—2 of Fig. 1.

Fig. 3 is a portion of the upper part of the bowl and is taken on line 3—3 of Fig. 1.

In the drawing I have used the numeral 10 to designate a hopper lid top such as used in the smokestand art, having an inwardly and downwardly sloping hopper wall 11 terminating in an opening. Such hopper walls are usually oblong in shape. In Fig. 1, the side view is transverse of the longitudinal length of this oblong wall and therefore does not show the large elongated opening in the bottom of the hopper top. The numeral 12 designates a shaft holding the elongated trap door 13 and manually actuated handles 14 on the outside of the hopper top body. The numeral 15 designates the usual spring for yieldingly holding the trap door in a closed position. These numbered parts are shown in the dotted lines inasmuch as they are only incidental to this invention. Their complete showing and description are to be found in the herebefore referred to Patent No. 2,248,163. The numeral 16 designates the bail handle. The numeral 17 designates the bowl or urn. Except for the later described opening in its central bottom, this urn is similar to smokestand bowls on the market and to the one shown in the referred to issued patent. In such well known smokestands, the lid 10 extends downwardly over the upper rim portion of the bowl and has diametrically arranged notches 18 for the two ends of the bail handle to loosely extend through and pierce the bowl as shown in Fig. 1. While it is to such a construction (shown in the herebefore designated issued patent) that I apply my invention, and which I will now describe in detail, it will be obvious that my invention may be applied to not only other types of designs of smokestands, but to any item having a receiving bowl and requiring a container and supporting means.

In the bottom center of the urn I form a hole and bend its margin downwardly into a circular threaded collar 19, as shown in Fig. 1. If desired, a hole may be cut and the collar made separately and attached to the bottom of the urn bowl by any suitable means, such as solder, spot welding, rivets, or like. The numeral 20 designates a threaded open mouth container of any suitable material such as glass, clay, metal, plastic, or like. In practice, however, I recommend the ordinary glass jar that is standard in most grocery stores. The small or large mouth variety may be used. In the drawings, I show the large mouth type. In Fig. 1 the view of the elongated trap door is transverse of its length, which length is greater than that of the inside diameter of even a wide-mouthed jar. This jar container is detachable, threaded in the collar 19 for easy removal and replacement. The numeral 21 designates the supporting column which is in the design of a tube having an inside diameter slightly greater than the outside diameter of the jar container. In the drawings the diameter of the bowl is substantially greater than the diameter of the column 21. In the upper marginal edge portion of the column, and communicating with its upper edge, are two diametrically opposite bayonet-slot openings 22. One of these bayonet slots is shown in detail in Fig. 2. The numeral 23 designates two diametrically opposite radially extending finger rods or prongs extending from the outer side of the collar. These two prongs 23 are capable of entering and engaging the two bayonet-slot openings 22, respectively. By this arrangement, with the jar screwed into the collar, the jar is inserted into the upper portion of the support tube and lowered therein as far as it will go. This downward movement of the jar will be limited by, either the prongs 23 engaging the top rim edge of the support, or by the bottom of the bowl engaging the rim edge of the support column. If the prongs engage to top rim edge of the column, the unit is rotated to left or right until the prongs drop into the bayonet slot openings. This permits the unit to drop downwardly until the under side of the bowl rests in the upper edge of the column support. To lock the unit to the support, the unit is rotated to the right to move the prongs into locked condition in the bayonet-slots, as shown in Fig. 2. If when placing the jar container in the column it moves downwardly until the bowl bottom engages the top rim of the column, it means that the prongs have entered the openings of the two bayonet slots, and then it is merely necessary to rotate the unit to the right to lock it to the support against accidental detachment. One of the important features of my assembly is that the unit may be attached or detached with one hand and without more than glancing at the device. The reason for this is that the jar container, when placed in the column, automatically centers the unit on the column. By rotating the unit, the weight of the same will drop the prongs into the bayonet-slots without detailed observation from the operator. By continuing the rotation of the unit to the right the same becomes locked to the support. This placement of the unit and the locking of the same can be accomplished with ease and almost in one continuous motion. Once the jar is started into the column, further observation in the matter is unnecessary. To unlock or remove the unit from the column, it is merely necessary to rotate the unit to the left as far as it will go, and then raise the unit upwardly until the prongs are free of the bayonet slots. In removal or replacement of the unit, the handle bail is used. This permits the use of one hand for lifting the unit, placing the same in the column, removal of the same from the column, and the rotating of the unit to the right or left for locking and unlocking. Furthermore, as soon as the unit is locked to the column, the entire smokestand or like may be lifted and carried by the bail handle and without the removal of the hand from the bail that just placed the unit in the column and locked it. In the same easy and quick manner the unit may be rotated to the left, and removed for inspecting the amount of material in the jar container. To empty the jar, it is unscrewed from the collar. For complete washing or cleaning the hopper top lid is removed from the bowl, and the jar from the bowl. Their reassembly is easy and uncomplicated. When assembled and on the support column, the jar 20 will be within the column and out of sight.

The inwardly curved wall of the bowl will aid in guiding material downwardly and into the container 20. By the bowl being between the trap door hopper top and the jar, the relatively small diameter opening of the jar will be substantially spaced apart from the trap door, and the trap door may therefore be operated without interference from the jar. This means that standard glass or like jars may be used, with a trap door having a length of width much greater than the diameter of the jar opening. By the handle bail being on the bowl, the trap door hopper top may be lifted from the bowl without affecting the bail.

Some changes may be made in the construction and arrangement of my receptacle construction without departing from the real spirit and purpose of my invention, and it is my intention to cover by my claims, any modified forms of structure or use of mechanical equivalents which may be reasonably included within their scope.

I claim:

1. A tubular supporting column having an upper rim resting in a horizontal plane, a bowl normally resting on the upper rim of said column having an inwardly sloping side wall and a bottom portion of a diameter greater than the diameter of said column for providing a seating shoulder for engaging and extending over and beyond the upper rim of said column whereby said bowl will be supported on said column in normal upright attitude; said bowl having an opening in its center bottom, a container on the bottom of said bowl communicating with the inside bottom of said bowl through said opening in the bowl center bottom, and slidably extending into the upper portion of said column and being closely housed and visibly shielded thereby, a hopper top on the upper portion of said bowl having a movable trap door; said trap door operating within the confines of said bowl and completely free of the area of said container whereby the diameter of the container and the diameter of the opening in the bottom of the bowl does not affect or restrict the size or operation of said trap door; said bowl solely supporting said container, said hopper top, and said trap door and said column solely supporting said bowl.

2. A tubular supporting column having an upper rim resting in a horizontal plane, a bowl normally resting on the upper rim of said column having an inwardly sloping side wall and a bottom portion of a diameter greater than the diameter of said column for providing a seating shoulder for engaging and extending over and beyond the upper rim of said column whereby said bowl will be supported on said column in normal upright attitude; said bowl having an opening in its center bottom, a container on the bottom of said bowl communicating with the inside bottom of said bowl through said opening in the bowl center bottom, and slidably extending into the upper portion of said column and being closely housed and visibly shielded thereby, a hopper top on the upper portion of said bowl having an opening, a manually rotatable horizontal shaft journaled in said hopper top, a trap door on said shaft capable of swinging upwardly for closing the opening in said hopper top, a means for yieldingly holding said trap door in a closed position under said hopper opening; said trap door operating within the confines of said bowl and completely free of the area of said container whereby the diameter of the container and the diameter of the opening in the bottom of the bowl does not affect or restrict the size or operation of said trap door; said bowl solely supporting said container, said hopper top, and said trap door and said column solely supporting said bowl.

3. A tubular supporting column having an upper rim resting in a horizontal plane, a bowl normally resting on the upper rim of said column having an inwardly sloping side wall and a bottom portion of a diameter greater than the diameter of said column for providing a seating shoulder for engaging and extending over and beyond the upper rim of said column whereby said bowl will be supported on said column in normal upright attitude; said bowl having an opening in its center bottom, a detachable container on the bottom of said bowl communicating with the inside bottom of said bowl through said opening in the bowl center bottom, and slidably extending into the upper portion of said column and being closely housed and visibly shielded thereby, a hopper top on the upper portion of said bowl having a movable trap door; said trap door operating within the confines of said bowl and completely free of the area of said container whereby the diameter of the container and the diameter of the opening in the bottom of the bowl does not affect or restrict the size or operation of said trap door; said bowl solely supporting said container, said hopper top, and said trap door and said column solely supporting said bowl.

4. A tubular supporting column having an upper rim resting in a horizontal plane, a bowl normally resting on the upper rim of said column having an inwardly sloping side wall and a bottom portion of a diameter greater than the diameter of said column for providing a seating shoulder for engaging and extending over and beyond the upper rim of said column whereby said bowl will be supported on said column in normal upright attitude; said bowl having an opening in its center bottom, a container on the bottom of said bowl communicating with the inside bottom of said bowl through said opening in the bowl center bottom, and slidably extending into the upper portion of said column and being housed and visibly shielded thereby, a hopper top on the upper portion of said bowl having a movable trap door; said trap door operating within the confines of said bowl and completely free of the area of said container whereby the diameter of the container and the diameter of the opening in the bottom of the bowl does not affect or restrict the size or operation of said trap door; said bowl solely supporting said container, said hopper top, and said trap door and said column solely supporting said bowl.

MARION TALBERT DICK.

REFERENCES CITED

The following references are of record in the file of this patent:

UNITED STATES PATENTS

| Number | Name | Date |
|---|---|---|
| 1,645,525 | Fleming | Oct. 18, 1927 |
| 1,999,140 | McDonald | Apr. 23, 1935 |
| 2,009,593 | Reichenbach | July 30, 1935 |
| 2,059,105 | Heisenfeldt | Oct. 27, 1936 |
| 2,248,163 | Dick et al. | July 8, 1941 |
| 2,365,946 | Fletcher | Dec. 26, 1944 |
| 2,437,226 | Fischer | Mar. 2, 1948 |